United States Patent
Lin et al.

(10) Patent No.: US 9,522,326 B2
(45) Date of Patent: Dec. 20, 2016

(54) HOLOGRAPHIC PROJECTION GAMING AND LEARNING SYSTEM

(71) Applicant: MIRAX Technology Corp., New Taipei (TW)

(72) Inventors: Chang-Lung Lin, Taipei (TW); Yung-Chang Chang, New Taipei (TW)

(73) Assignee: MIRAX TECHNOLOGY CORP., New Taipei (TW)

( * ) Notice: Subject to any disclaimer, the term of this patent is extended or adjusted under 35 U.S.C. 154(b) by 161 days.

(21) Appl. No.: 14/625,246

(22) Filed: Feb. 18, 2015

(65) Prior Publication Data
US 2016/0236079 A1    Aug. 18, 2016

(51) Int. Cl.
*A63F 13/25*    (2014.01)

(52) U.S. Cl.
CPC ..................... *A63F 13/25* (2014.09)

(58) Field of Classification Search
CPC ........ A63F 13/25; A63F 2300/30; G03H 1/00; G03H 1/02; G03H 2001/0212; G03H 2001/0216; G06F 3/01
USPC ......................................................... 463/34
See application file for complete search history.

(56) References Cited

U.S. PATENT DOCUMENTS

| | | | | | |
|---|---|---|---|---|---|
| 4,421,317 | A | * | 12/1983 | Hector | A63F 13/08 359/1 |
| 5,355,224 | A | * | 10/1994 | Wallace | G02B 23/10 359/351 |
| 5,421,589 | A | * | 6/1995 | Monroe | A63F 13/08 345/9 |
| 2011/0086703 | A1 | * | 4/2011 | Miller | G07F 17/3211 463/31 |

* cited by examiner

*Primary Examiner* — Allen Chan
(74) *Attorney, Agent, or Firm* — Muncy, Geissler, Olds & Lowe, P.C.

(57) ABSTRACT

A holographic projection gaming and learning system comprises a holographic projection device, an input unit used to present one or more instruction contents and an electronic device having a screen, wherein the holographic projection device includes at least a placement board configured with an opening, at least a projection refraction board and at least a supportive positioning component; therefore, upon placing the electronic device on the placement board of the holographic projection device, the capture module of the electronic device can capture the instruction contents provided by the input unit and transfer to the application software thereby that the application software determines the received instruction contents to display at least a holograph image on the screen, and the holograph image displayed on the screen of the electronic device can be illuminated onto the projection refraction panel of the projection refraction board via the opening of the placement board and then the projection refraction panel projects the holograph image outward for imaging, so that the system according to the present invention can closely combine the holograph image contents with the desktop gaming processes in order to further increase the playfulness of the game.

4 Claims, 7 Drawing Sheets

HOLOGRAPHIC PROJECTION GAMING AND LEARNING SYSTEM

BACKGROUND OF THE INVENTION

1. Field of the Invention

The present invention generally relates to a holographic projection gaming and learning system; in particular, it relates to a system applying the holographic projection technology to render images through light/image reflections in order to visually generate mid-air floating and holograph imaging effects, and such a system allows the user to better interact with the contents, especially suitable for acting as a holographic projection gaming and learning system with regards to desktop game variations and learning applications.

2. Description of Related Art

For many players, Monopoly is a desktop game that people commonly are quite familiar with and cherish in their memory. In a traditional board game, there usually provides a paper board on which a route map is printed as the game path, in conjunction with some other accessories such as paper cards like "Opportunity", "Fate", or dices and so forth, then people can start to play the game; briefly speaking, each player can make a forward move according to the number shown on the dices the player threw as well as the itinerary or notches scheduled on the route map, then do the next move by following the instructions set forth in that specific notch.

However, due to restrictions on physical devices, variations in such traditional board games may be very limited. Hence, to facilitate gaming diversities, vendors provide computer-oriented Monopoly games thus developing network virtual gaming interfaces; but traditional board games are still favored by a great number of people because of genuine interactions between human beings. Moreover, in modern days it is common that computer games or network games may undesirably cause radiation issues for people's vision, and the longer time the user utilizes 3C products, the potential damage to the user's eyes may possibly become more significant.

As such, to improve the drawbacks found in traditional board games and also prevent potential damages to user's eyesight because of long-time game playing, it is considered to apply the holographic projection technology for imaging in order to visually create the effects of mid-air floating and holograph imaging through light/image reflections. Hence, it may be less harmful to user's eyes when the user plays games within a longer duration of time, and, compared with traditional board games, the holographic projection technology can offer better variations and interactions; consequently, the present invention would be an optimal solution.

SUMMARY OF THE INVENTION

The present invention proposes a holographic projection gaming and learning system which applies the holographic projection technology to render images through light/image reflections in order to visually generate mid-air floating and holograph imaging effects, and also allows the user to better interact with the contents, thus simultaneously providing the user with better physical desktop game enjoyments as well as enhanced audio/video effects and interactions of virtual holographic contents.

A holographic projection gaming and learning system, comprising: at least a placement board, configured with an opening; at least a projection refraction board, connected to the placement board, in which a projection refraction panel is installed on the projection refraction board and the opening of the placement board faces the projection refraction panel; at least a supportive positioning component, connected to the projection refraction board in order to support the standing of the projection refraction board; an input unit, used to provide the instruction contents of the holograph image to be presented; an electronic device having a screen, in which the electronic device is placed on the placement board of the holographic projection device and the screen of the electronic device is installed toward the opening of the placement board, wherein the electronic device includes: an application software, installed within the electronic device, in which the application software determines the instruction contents received by the input unit, displays at least a holograph image on the screen, and the holograph image displayed on the screen of the electronic device is illuminated onto the projection refraction panel of the projection refraction board via the opening of the placement board, and then the projection refraction panel projects the holograph image outward for imaging; and a capture module, installed on the electronic device, in which the capture module is used to transfer the captured instruction contents to the application software such that the application software can determine the received instruction contents and display the holograph image corresponding to the instruction contents on the screen of the electronic device.

More specifically, the instruction contents provided by the input unit and captured by the capture module may be a graphic message, a text message, a number message, an audio message, an electronic signal message or a combination thereof.

More specifically, the interior of the application software includes a built-in data storage module which has various holograph images and real-time interactive games corresponding to different instruction contents, and, when the application software receives new instruction contents, it is possible to search the holograph image or real-time interactive game corresponding to such new instruction contents in the data storage module and display the searched holograph image or real-time interactive game on the screen of the electronic device.

More specifically, the holograph image displayed on the screen of the electronic device may be a holograph graphics, a holograph image, an animation, a real-time rendering graphics, a video sequence or a combination thereof.

DETAILED DESCRIPTION OF THE PREFERRED EMBODIMENTS

Other technical contents, aspects and effects in relation to the present invention can be clearly appreciated through the detailed descriptions concerning the preferred embodiments of the present invention in conjunction with the appended drawings.

Figure 1:
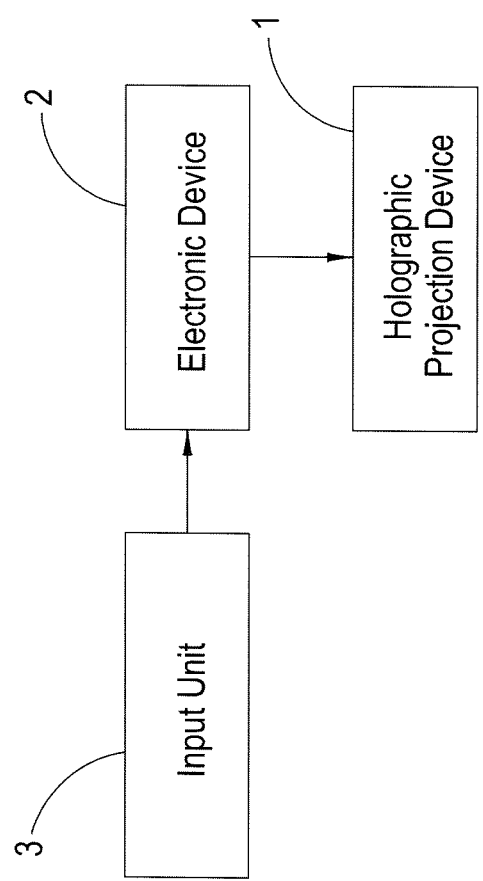
FIG. 1 shows an overall architecture diagram for the holographic projection gaming and learning system according to the present invention.
Figure 2A:
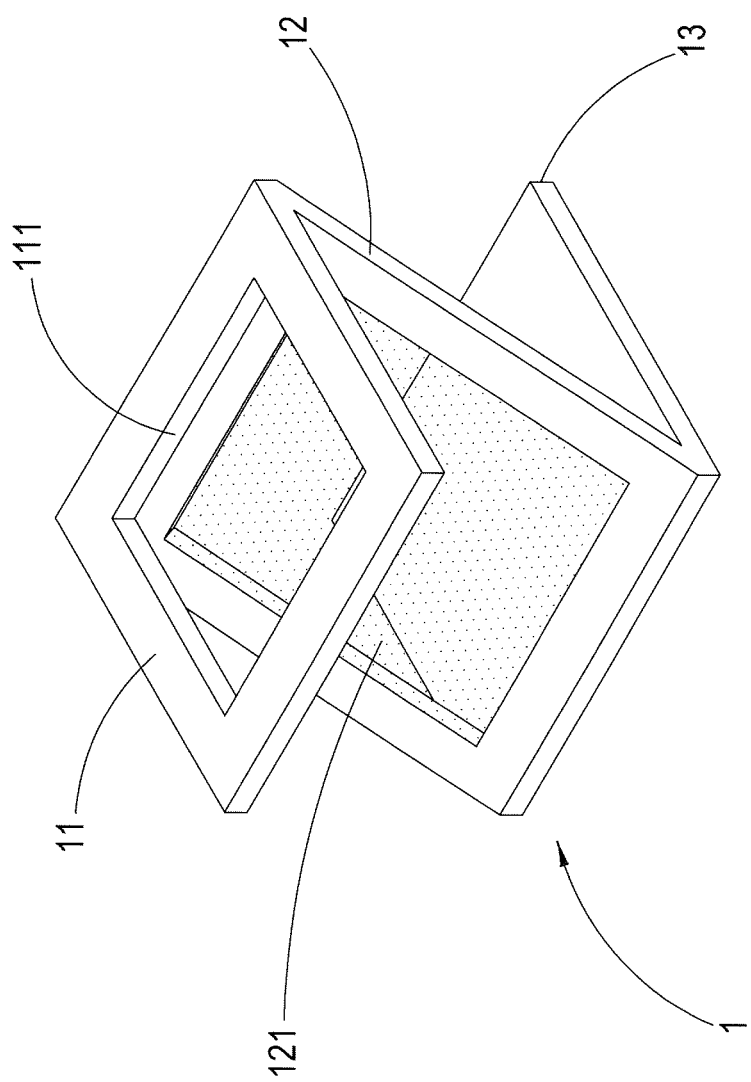
FIG. 2A shows a structure diagram for the holographic projection device of the holographic projection gaming and learning system according to the present invention.

Refer now to FIG. 1, wherein an overall architecture diagram for the holographic projection gaming and learning system according to the present invention is shown. It can be appreciated from the Figure that the holographic projection gaming and learning system comprises a holographic projection device 1, an electronic device 2 and an input device 3. And from FIG. 2 it can be appreciated that the holographic projection device 1 mainly includes at least a placement board 11, at least a projection refraction board 12 and at least a supportive positioning component 13, and the configuration shown in FIG. 2A is simply one of many possible ones. It is also possible, however, to assemble the above-said placement board 11, projection refraction board 12 and supportive positioning component 13 into a holographic projection device 1 of different configurations, wherein a through opening 111 can be configured at the center of the placement board 11, a projection refraction panel 121 may be installed on the projection refraction board 12 (the projection refraction panel 121 can be replaced by a specular refraction implementation), and the opening 111 of the placement board 12 faces the projection refraction panel 121. Besides, the supportive positioning component 13 can be applied to sustain the standing of the projection refraction board 12, and the holographic projection device 1 can be retracted and folded up for convenient package and portability; moreover; although it is embodied in a Z-shaped structure in the present embodiment, it can be also implemented as a box-like structure.

Figure 2B:
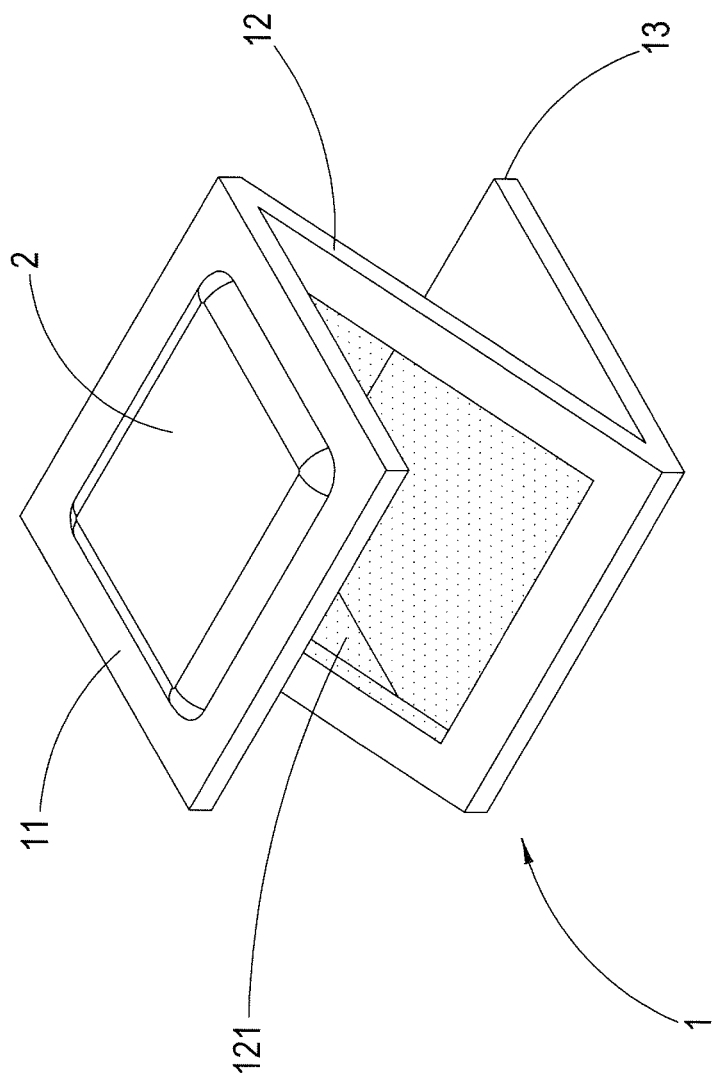
FIG. 2B shows a structure diagram for the combination of the holographic projection device and the electronic device in the holographic projection gaming and learning system according to the present invention.
Figure 2C:
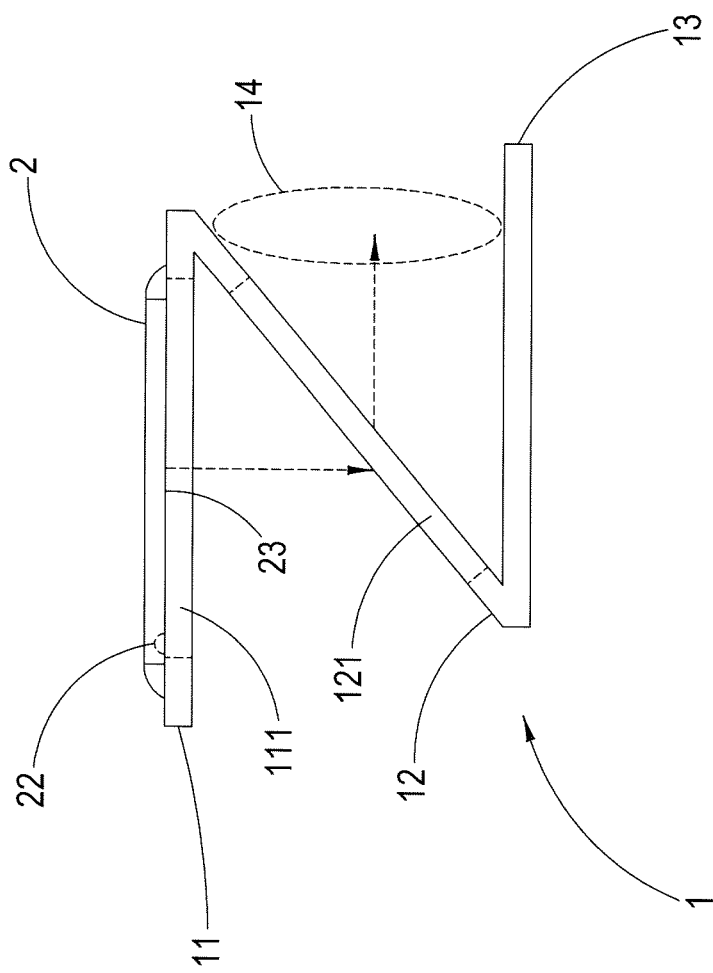
FIG. 2C shows a side view for the combination of the holographic projection device and the electronic device in the holographic projection gaming and learning system according to the present invention.

Moreover, it can be seen from FIGS. 2B and 2C that, by placing the electronic device 2 onto the placement board 11 and making the screen of the electronic device 2 face the opening 111, the holograph image displayed on the screen can be illuminated onto the projection refraction panel 121 via the opening 111, and since the projection refraction panel 121 is a transflective lens, it allows people to see the virtual image reflected by the projection refraction panel 121 in the rear holographic display area 14 so as to exhibit the mid-air floating effect.

Figure 3:
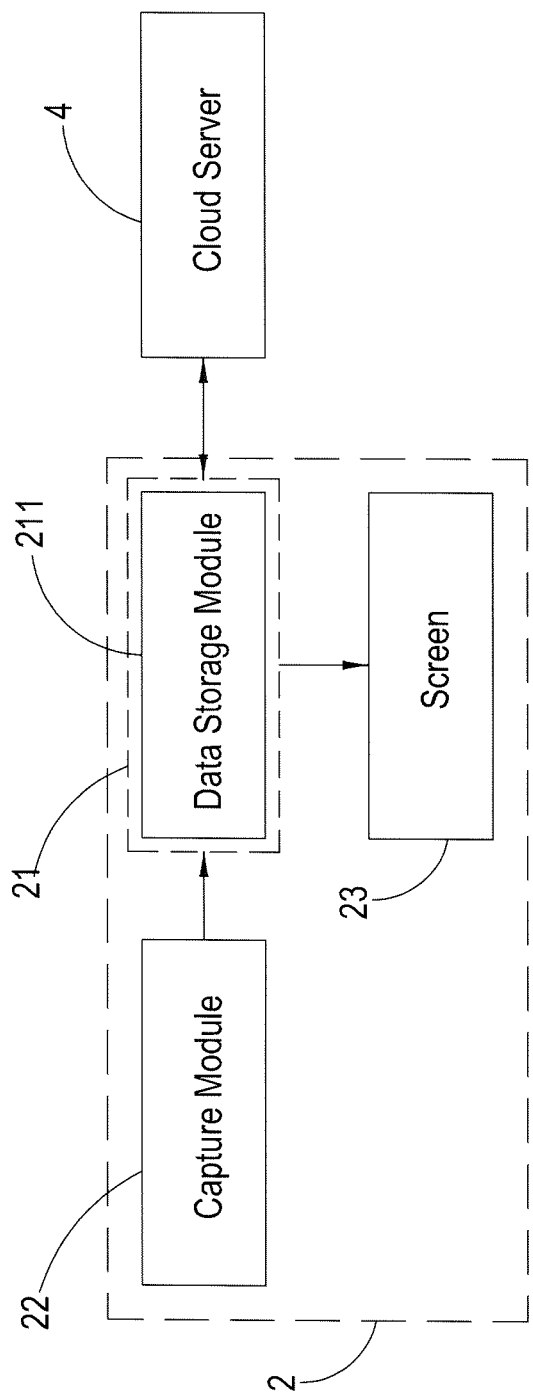
FIG. 3 shows an internal architecture diagram for the electronic device of the holographic projection gaming and learning system according to the present invention.

It can be further observed from FIG. 3 that the electronic device 2 includes an application software 21, a capture module 22 (e.g. a device such as a camera) and a screen 23, wherein the application software 21 is installed within the electronic device 2 and internally has a built-in data storage module 211, and the data storage module 211 has various holograph image data corresponding to different instruction contents (herein said holograph image refers to a holograph graphics, a holograph image, an animation, a gaming real-time rendering graphics, a video sequence or a combination thereof), so that, when the application software 21 receives new instruction contents, it is possible to search the holograph image corresponding to the new instruction contents in the data storage module 211 and display the acquired holograph image on the screen 23 of the electronic device 2; additionally, the holograph image displayed on the screen 23 of the electronic device 2 can be projected onto the projection refraction panel 121 of the projection refraction board 12 via the opening 111 of the placement board 11, and then the projection refraction panel 121 further projects the holograph image outward for imaging.

Figure 4:
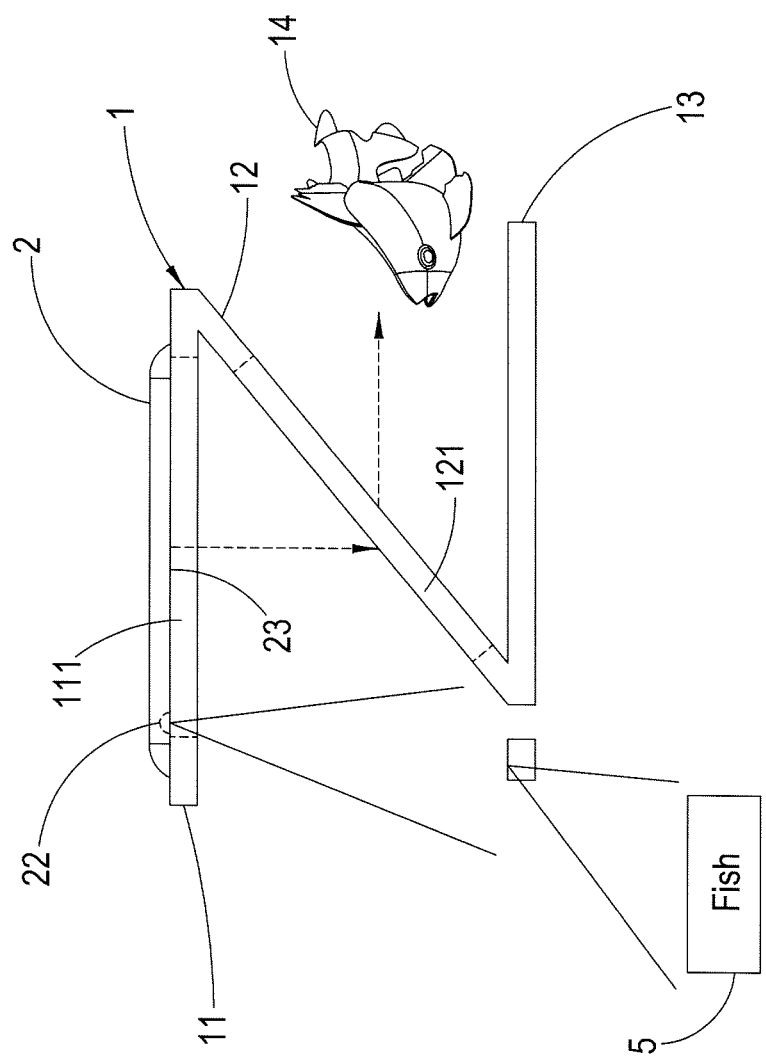
FIG. 4 shows an implementation diagram for the holographic projection gaming and learning system according to the present invention.

Herein the present invention applies the input unit 3 for entering instruction contents, in which the input unit 3 may be a card, a wireless controller (e.g., a type of wireless control device such as NFC, Bluetooth™ etc.) or any objects or actions capable of providing the gesture message, graphic message, text message, number message, audio message, electronic signal message or a combination thereof. FIG. 4 shows an application embodiment of the present invention (herein a user may learn English vocabulary by means of a card or a Bluetooth™ stylus pointer device), and it can be seen from the Figure that the user initially places a vocabulary card 5 in an area that the capture device 22 can scan, and because there is a word "Fish" inscribed on the vocabulary card 5, the capture device 22 can scan over this word "Fish", the data storage module 211 is searched and a holograph image corresponding to "Fish" is displayed so that an image of a fish appears in the holographic display area 14 (explanations about the pronunciation and spelling of the word can be certainly added to this holograph image for better learning results); and, after having learned 10 words, for example, a quiz animation may be presented in the holographic display area 14 (not shown), so that the user needs to put the right card into the area that the capture module 22 can scan to answer the questions correctly. Meanwhile, in operation, it may present some small clips of challenge game animations and the user can perform real-time interactions with the animation by using other input unit 3 (e.g., a Bluetooth™ device) thus making the learning processes more fun.

In the above-said embodiment, the application software 21 of the electronic device 2 may be further connected to a cloud server 4 in order to download new study materials into the application software 21.

The aforementioned embodiment illustrates a scenario of single-user condition, but the present invention can be also suitably applied to a scenario of multiple-user condition, e.g., four (4) users, using four connected or separate holographic projection devices 1, with each of such holographic projection devices 1 being mutually connectable.

Additionally, in playing games, each user chooses his or her own role card and places it to the area that the capture module 22 can scan and sense in order to become the role, which in the physical game a role chessman is used to represent the user; then, after each user has chosen a role card for sensing, the role chessman can be placed at the start point. Following this, the gaming order can be determined by way of throwing the dices, and the player having a greater number moves first, then proceeds in a clockwise direction. The player throws the two dices and makes forward moves according to the thrown number of dots, and all moves are clockwise unless specifically indicated. Suppose the chessman arrives at a certain piece of land, the player can choose to purchase it if this land is idle, or otherwise the player needs to pay the rent to the owner of the land. However, in case it stops at an "Opportunity" or "Fate" notch, the player can draw a card and place it to the area that the capture module 22 can scan for sensing, then the holographic display area 14 presents an event animation randomly based on the sense result such that the player's award or penalty or else the number of forward or backward steps can be determined in according to the event animation result.

In gaming operations, the application software 21 can automatically calculate each user's money, perform addition or subtraction operations based on the events occurring to each role and display the results in the holographic display area 14, such that in case any of the users does not have sufficient money to pay the required sum of money, the player can declare bankrupt and quit the game, and the holographic display area 14 may present an animation clip to indicate the player role is disappointed and leaves the game.

Although the aforementioned descriptions illustrate gaming applications for single or multiple players, the gaming or learning types may not be limited to the previously explained items; rather, it can be modified in accordance with the software categories designed within the application software 21.

Figure 5:
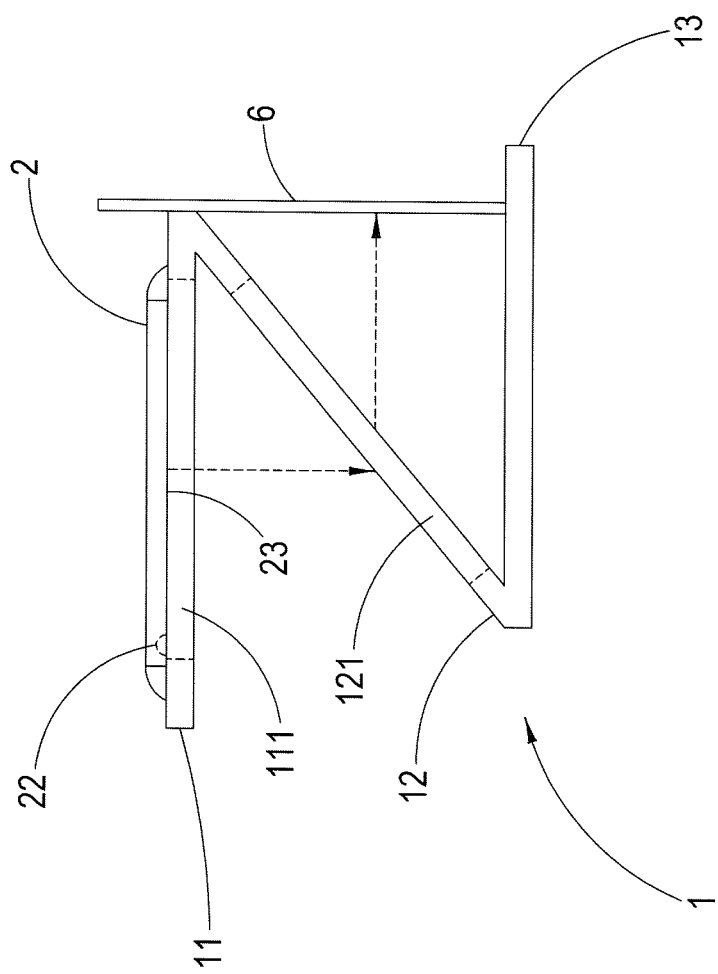
FIG. 5 shows another structure diagram for the holographic projection device of the holographic projection gaming and learning system according to the present invention.

Additionally, as shown in FIG. 5, it is possible to alternatively place a dark-colored plate 6 (on which graphics or texts may be added) at the holographic display area 14, so that, upon illuminating the holograph image displayed on the screen 23 of the electronic device 2 onto the projection refraction panel 121 of the projection refraction board 12 via the opening 111 of the placement board 11, the projection refraction panel 121 can further project the holograph image outward to the surface of the plate 6 for imaging thereon, while its dark color can make the projected image even more eidetic.

In comparison with other conventional technologies, the holographic projection gaming and learning system according to the present invention provides the following advantages:

The present invention overcomes the drawbacks found in traditional board games and also prevents damages to user's eyesight because of long-time game playing, so the holographic projection technology is applied for imaging in order to visually create the effects of mid-air floating and holograph imaging through light/image reflections. As a result, in case of long-time gaming, it may be less harmful to the user's eyes, and the holographic projection technology can offer better variations and interactions than traditional board games such that the holograph image contents and desktop gaming can be closely jointed in order to enhance the playfulness of the game.

Although the present invention has been disclosed through the detailed descriptions of the aforementioned embodiments, such illustrations are by no means used to restrict the present invention. Skilled ones in relevant fields of the present invention can certainly devise any applicable alternations and modifications after comprehending the aforementioned technical characteristics and embodiments of the present invention without departing from the spirit and scope thereof. Hence, the scope of the present invention to be protected under patent laws should be delineated in accordance with the claims set forth hereunder in the present specification.

What is claimed is:

1. A holographic projection gaming and learning system, comprising:
  a holographic projection device, including:
    at least a placement board, configured with an opening;
    at least a projection refraction board, connected to the placement board, in which a projection refraction panel is installed on the projection refraction board and the opening of the placement board faces the projection refraction panel;
    at least a supportive positioning component, connected to the projection refraction board in order to support the standing of the projection refraction board;
  an input unit, used to provide the instruction contents of the holograph image to be presented;
  an electronic device having a screen, in which the electronic device is placed on the placement board of the holographic projection device and the screen of the electronic device is installed toward the opening of the placement board, wherein the electronic device includes:
    an application software, installed within the electronic device, in which the application software determines the instruction contents received by the input unit, displays at least a holograph image on the screen, and the holograph image displayed on the screen of the electronic device is illuminated onto the projection refraction panel of the projection refraction board via the opening of the placement board, and then the projection refraction panel projects the holograph image outward for imaging; and
    a capture module, installed on the electronic device, in which the capture module is used to transfer the captured instruction contents to the application software such that the application software can determine the received instruction contents and display the holograph image corresponding to the instruction contents on the screen of the electronic device.

2. The holographic projection gaming and learning system according to claim 1, wherein the instruction contents provided by the input unit and captured by the capture module is a graphic message, a text message, a number message, an audio message, an electronic signal message or a combination thereof.

3. The holographic projection gaming and learning system according to claim 1, wherein the interior of the application software includes a built-in data storage module which has various holograph images and real-time interactive games corresponding to different instruction contents, and, when the application software receives new instruction contents, it is possible to search the holograph image or real-time interactive game corresponding to such new instruction contents in the data storage module and display the searched holograph image or real-time interactive game on the screen of the electronic device.

4. The holographic projection gaming and learning system according to claim 1, wherein the holograph image displayed on the screen of the electronic device is a holograph graphics, a holograph image, an animation, a real-time rendering and interactive game or a combination thereof.

* * * * *